Oct. 20, 1925.

F. M. FURBER 1,557,579

PATENT LEATHER REPAIRING MACHINE

Original Filed Dec. 2, 1916    3 Sheets-Sheet 1

INVENTOR.
Frederick M. Furber
By his Attorney
Nelson M. Howard

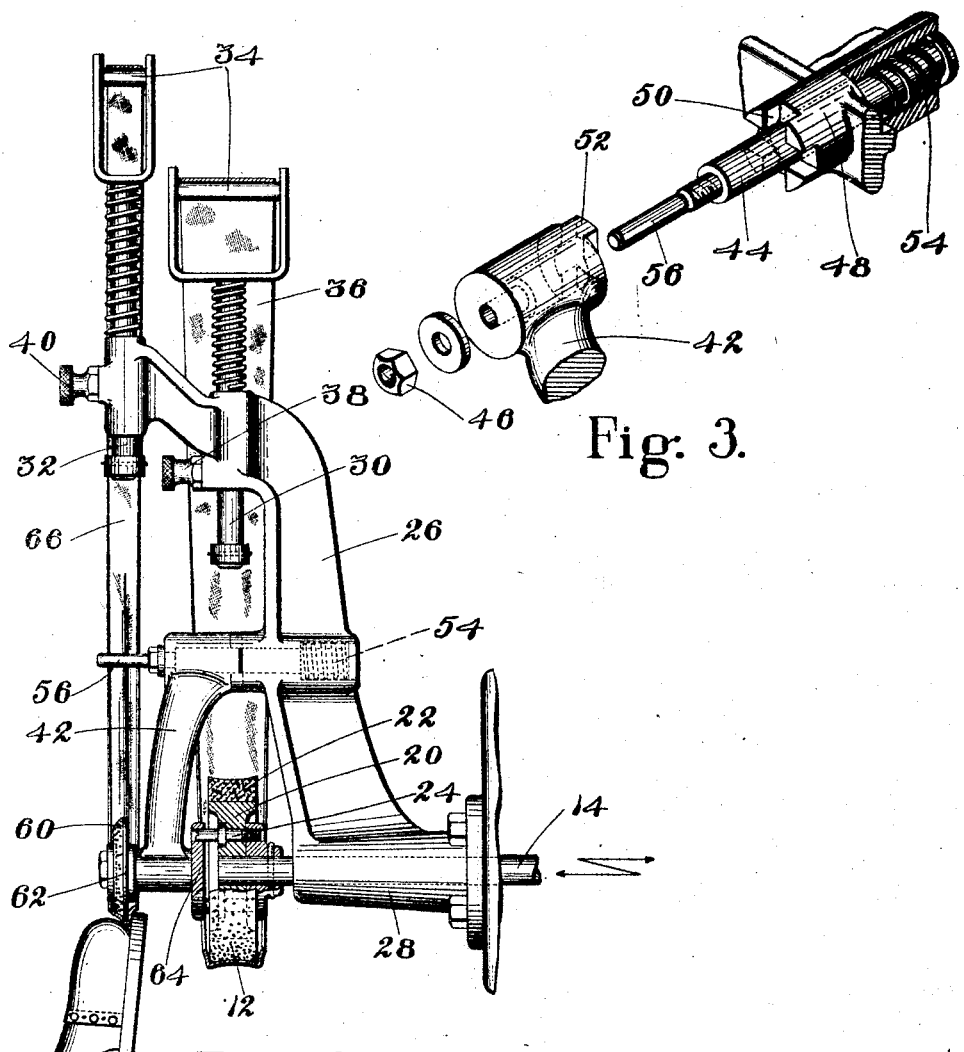

Oct. 20, 1925.  
F. M. FURBER  
1,557,579  
PATENT LEATHER REPAIRING MACHINE  
Original Filed Dec. 2, 1916    3 Sheets-Sheet 3

INVENTOR  
Frederick M Furber

Patented Oct. 20, 1925.

1,557,579

UNITED STATES PATENT OFFICE.

FREDERICK M. FURBER, OF REVERE, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

PATENT-LEATHER-REPAIRING MACHINE.

Application filed December 2, 1916, Serial No. 134,701. Renewed March 5, 1925.

*To all whom it may concern:*

Be it known that I, FREDERICK M. FURBER, a citizen of the United States, residing at Revere, in the county of Suffolk and State of Massachusetts, have invented certain Improvements in Patent-Leather-Repairing Machines, of which the following description, in connection with the accompanying drawings, is a specification, like reference characters on the drawings indicating like parts in the several figures.

This invention relates to machines for use in the manufacture of boots and shoes. More specifically it relates to improvements in a machine for repairing imperfections in the tips of boots or shoes made of patent leather.

In my Patent No. 1,096,423, I have described a machine which is especially adapted for repairing cracks or other imperfections which may be caused during the manufacture of a patent leather shoe. This machine is provided with a tool having a relatively broad resilient work surface around which is wrapped a strip of sheet material. Difficulty is sometimes experienced in bringing this tool closely into the rand crease of a shoe and, in order to overcome this difficulty, I have devised a novel machine in which there is provided an auxiliary tool preferably having a relatively narrow work surface and arranged so that it may be brought into or removed from operative position beside and immediately adjacent to said main tool so that it occupies substantially the same position with relation to the whole machine as the main tool and is therefore conveniently located for the application of work to the tool by the operator, and this constitutes one important feature of the invention.

In the illustrated embodiment, the main tool is given a compound movement, as one of oscillation and reciprocation, while the auxiliary tool receives but one component of this movement, as the oscillation. Important features of the invention reside in the arrangement of two tools which are connected to a common shaft so that one tool has imparted to it one sort of movement while to the other tool there is imparted a different sort of movement which is only a part of the movement of the first tool. Such a machine is described in the following specification and shown in the accompanying drawings in which—

Fig. 2 is a plan view, partly in section, of the main and auxiliary tools and their supporting bracket; and Fig. 3 is a view of the supporting bracket for the auxiliary tool with the parts in separated positions.

Figure 1:
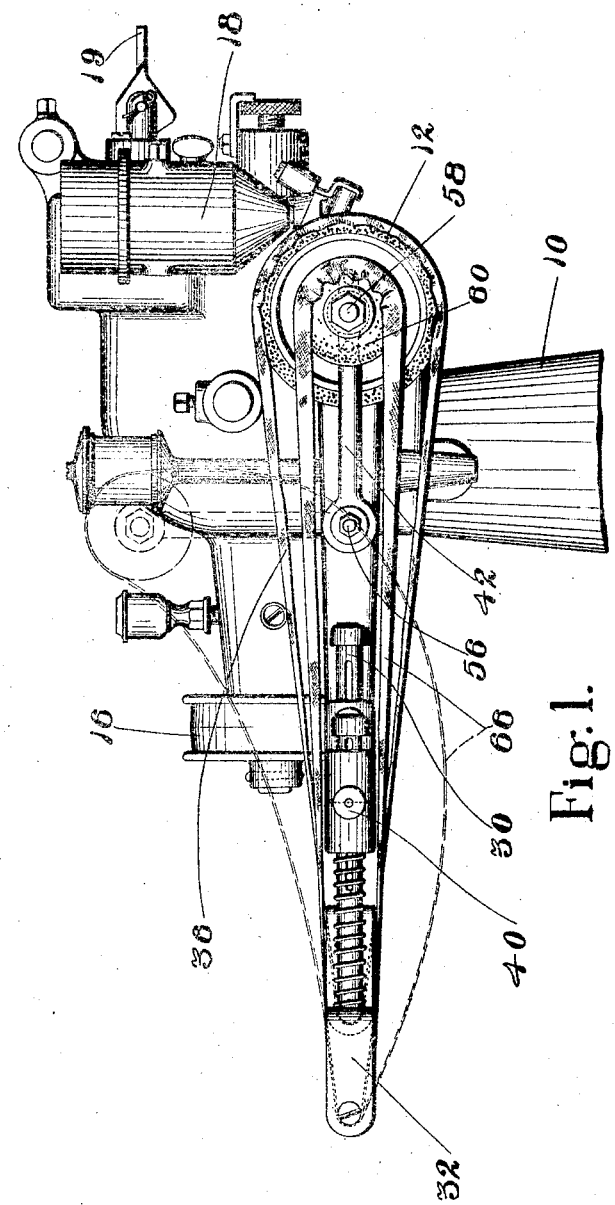
Fig. 1 is an end view of a machine to which this invention has been applied.

The detailed construction of a machine of this type may be seen from an inspection of the above-mentioned patent. It will be understood that such a machine comprises a standard or frame 10 on which is rotatably supported a main tool 12 which is mounted upon a tool shaft 14 and that a combined oscillating and reciprocating motion is imparted to this shaft from a power shaft 8 rotated by means of a driving pulley 16.

Figure 4:
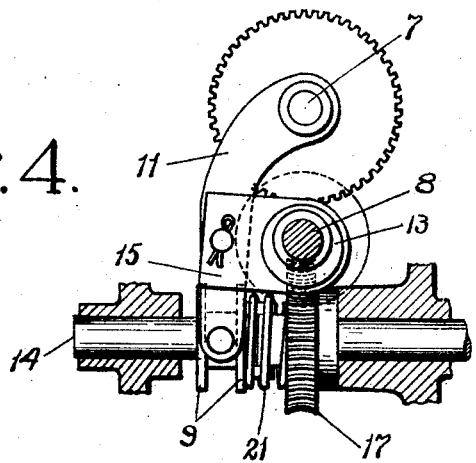
Fig. 4 is a view partly in section taken parallel to the tool shaft showing the operating mechanism within the casing.
Figure 5:
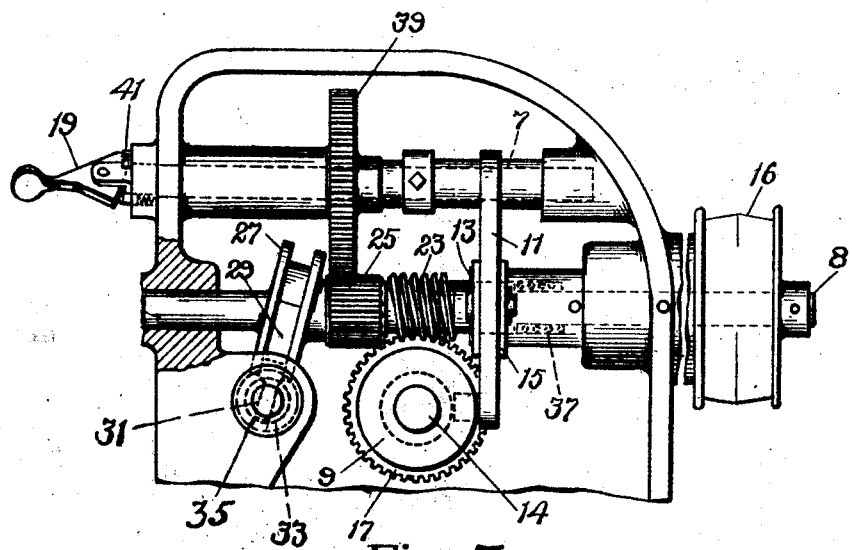
Fig. 5 is a similar view taken parallel to the driving shaft.

Below the shaft 8 and extending at right angles thereto is supported the tool shaft 14, this shaft being received in bearings formed respectively in the casing and its cover. Mechanism is provided to transmit motion from the drive shaft to the tool shaft, to reciprocate the tool shaft axially, to oscillate it about its axis and to give it a rotative movement when desired. The axial reciprocation of the tool shaft 14 is effected by means of a collar 9 fast on the shaft 14 and a lever 11 fulcrumed on a shaft 7 supported in bearings formed in the casing. The lever carries at its lower end a roll positioned between the flanges of the collar 9; and it is rocked on its fulcrum by means of an eccentric bushing 13 fast on the drive shaft 8 and a short connecting rod 15 mounted on the eccentric and pivoted to the lever. It will be evident that when the shaft 8 and eccentric 13 are rotated, the connections described will produce an oscillating motion of the lever 11 which will be transmitted through the collar 9 to the shaft 14, causing the shaft to reciprocate rapidly through its bearings. Both the oscillating and rotary movements of the shaft 14 are transmitted thereto through a gear 17. This gear, shown in Fig. 4, has a sliding connection with the hub of the collar 9 that permits the hub and the shaft 14 to slide axially of the gear, but compels the shaft to rotate with the gear. A spring 21, interposed between the collar 9 and gear 17, serves to hold the gear against the bearing in the casing as the shaft moves back and forth. A worm gear 23 and a pinion 25 rigidly connected together are frictionally mounted on the drive shaft 8; the worm gear meshing with the gear 17 on the tool shaft. Fixed to the shaft 8 is a collar 27 having its two parallel flanges inclined to the axis of rotation of the shaft. A U-shaped member 29 straddles the hub of the collar 27 and fits snugly between the flanges of the latter member. The part 29, which for convenience will hereinafter be termed an oscillator, has a cylindrical stem 31 that projects below the shaft 8 and is mounted to oscillate in a pivot 33, which itself is rotatably mounted in a bushing 35 extending at right angles to the shaft 8. It will be understood from an inspection of Fig. 5 and from the foregoing description that the oscillator 29 is free to oscillate on its stem 31, and that it can swing on the pivot 33. It should be noted also that the axis of the stem 31 intersects the axis of the shaft 8, while the axis of the pivot 33 lies below and at right angles to the shaft 8. If the shaft 8 is rotated through an angle of 180°, starting from the position in which it is shown in Fig. 5, the part of the collar 27 that is uppermost in said figure will be moved down close to the pivot 33 and the collar will assume a position tilting to the left instead of to the right as shown in Fig. 5. It will be evident, however, that in order to have this movement take place, there must be a longitudinal movement of the shaft 8 toward the left as seen in Fig. 5 since the pivot 33 is fixed against movement longitudinally of the shaft 8. Upon a further rotation of the shaft 8 through another 180°, the parts will be returned to the positions in which they are shown in Fig. 5 and the shaft 8 will be given a movement toward the right. Between these positions the oscillator 29 will rock about the axis of the stem 31 and the shaft 8 will move in one direction or the other. The worm gear 23 and pinion 25 are crowded toward the inclined collar 27 by a strong spring 37 positioned in a counterbored space in eccentric 13; consequently they reciprocate with the shaft 8, and the connection of the worm gear 23 with the gear 17 causes the tool shaft 14 to oscillate about its axis.

It will be evident that if the worm gear 23 were not restrained from rotating with the drive shaft 8 it would cause a continuous rotative movement of the tool shaft 14. This restraint is effected by a stop mechanism that comprises a gear 39 fast on the shaft 7, the pinion 25 meshing with the gear 39, a stop 41 also fast on the casing and a latch 19 arranged to engage the stop and hold the shaft 7 against rotation. The latch 19, as shown in Fig. 1, is mounted in the slotted end of the shaft 7 and a spring (not shown) moves the latch 19 in a direction to hold its locking end in contact with the stop 41. If the latch is moved against the tension of the spring, it will release the shaft, whereupon the worm gear 23 will begin to rotate with the shaft 8 thus rotating the gear 17 and tool shaft 14. This rotation will continue until the latch 19 is released, and allowed to engage again the stop 41, thus acting through the shaft 7, gear 39, and pinion 25 to prevent further rotative movement of the worm gear.

Conveniently mounted upon the frame of the machine is an enamel dispenser 18, here shown as of the type described in Letters Patent of the United States No. 1,209,989 granted Oct. 31, 1916 upon my application Serial No. 750,303, filed Feb. 24, 1913.

The tool 12 preferably comprises a rigid foundation or hub 20 which is surrounded by a resilient rim or tire 22 having a relatively broad work surface which is preferably slightly concave. Projecting from the hub 20 and here shown as securing the same to the tool shaft 14 are pins 24 whose purpose will be later described. A bracket 26 bolted to the frame of the machine provides at its inner end a journal 28 for the work shaft and at its outer end supports two spring-pressed plungers 30 and 32 each of which has a forked end provided with a cylindrical cross piece 34. Wrapped around the body of the tool 12 and the cross piece of the plunger 30 is a strip of sheet material 36 for the well understood purpose of providing an easily renewable surface for the tool. Pins 38 and 40 are provided in the bracket for retaining each of the plungers in position with its spring compressed whereby the strip of sheet material may be readily removed and replaced thereon. At an intermediate point of the main bracket 26 is an auxiliary bracket 42 which is pivotally mounted upon a spring-pressed axle 44 and held thereon by means of a nut 46 threaded to said axle. The boss 48 surrounding said axle upon the main bracket is formed with a plurality of recesses 50 in which the projections 52 upon the bracket 42 may set so as to hold said bracket either in or out of operative position, that is to say, in horizontal or vertical position. The spring 54 surrounding the axle 44 holds the projections 52 in engagement with the recesses 50. The axle 44 is extended at its outer end to form a pin 56 for a purpose to be later explained. Journaled in the outer end of the bracket 42 is a shaft 58 carrying the auxiliary tool 60 comprising a thin disc of resilient material such as rubber backed up by a metal plate 62. On the other end of this shaft is a plate 64 provided with apertures adapted to be operatively engaged with the pins 24 secured to the work shaft 14. By means of this arrangement, the auxiliary tool will oscillate with the main tool but its motion will be in a fixed plane and it will have no motion longitudinally of its axis as does the main tool. Surrounding the auxiliary tool is a strip of sheet material 66 which is tensioned by means of the bar 34 in the corresponding spring-pressed plunger 32.

As described in my previous patent, the machine is so arranged that a feeding movement may be given to the strip of sheet material, at will, so as to bring a fresh portion into position for use. This feeding movement is under control of the operator who will depress a latch 19 and at once release the same to allow a single rotation of the shaft with which the latch is associated. This will result in moving the strip of sheet material forward for approximately an inch.

It will now be seen that if the cracks in the tip of a shoe run into the rand crease so far that they cannot be conveniently reached by means of the main tool 12, then the auxiliary tool 60 may be brought into operative position beside the main tool and in substantially the same position relative to the frame as the main tool by pulling the bracket 42 outward against the tension of the spring 54, turning it through an arc of 90° and releasing it so as to cause the projections 52 to engage with the corresponding vertical recesses 50 and at the same time causing the apertures in the plate 64 to engage with the pins 24. Because of the relatively narrow work surface, which is here shown as tapered to a thin edge, this auxiliary tool with its covering of cloth or similar material may be brought into the rand crease, in the manner illustrated in Fig. 2, much more readily than could the broad faced tool 12. The thinness of the auxiliary tool necessitates the backing plate 62 in order that the tool may be kept in shape and not be distorted by use or by the tension of the strip of sheet material 66. When the auxiliary tool is no longer required, the bracket may be returned to the vertical position, as shown in dotted lines in Fig. 1, where it will not interfere with the free use of the main tool 12. It should be noted that when in this position, the extension 56 helps to hold the loose strip 66 out of contact with the strip 36 associated with the main tool. In view of the particular form and use of the auxiliary tool, it is obviously undesirable to impart to it any movement longitudinally of its axis. This result is readily secured by the peculiar connection between the auxiliary tool and the tool shaft 14. The auxiliary tool will, however, have an oscillating movement whereby the enamel will be thoroughly rubbed into the work and may also be given a feeding movement similar to that of the main tool at the will of the operator.

While I have herein described the best embodiment of this construction now known to me, it will be understood that I do not wish to be limited to the exact construction shown but seek to cover in the appended claims all those modifications which come within the true scope and spirit of the invention.

Having thus described my invention, what I claim as new and desire to secure by Letters Patent of the United States is:—

1. In a machine of the class described, a supporting frame, a tool movably mounted thereon in a predetermined position conveniently arranged for the application of work thereto by the operator, means for moving said tool to give it a work rubbing movement, an auxiliary tool of different character, means for adjustably supporting the auxiliary tool upon the frame and permitting said tool to be brought into an operative position beside the main tool, and to be removed from such operative position to allow the operator freedom in application of the work to the main tool, means for retaining the auxiliary tool in such operative position, and connections between the moving means for the main tool and said auxiliary tool, arranged to impart to the latter a movement differing from that of the former.

2. In a machine of the class described, a supporting frame, a main tool movably mounted on the frame for the application thereto of the work, means for moving said tool to give it a work-rubbing movement, an auxiliary tool adjustably supported upon the frame and mounted to permit it to be brought into operative position beside the main tool, and means effective only when the auxiliary tool is in its operating position for transmitting a work-rubbing movement from the main tool to said auxiliary tool.

3. In a machine of the class described, a main tool and an auxiliary tool including strips of sheet material, an actuating shaft to which the main tool is normally connected, means for tensioning said strips to hold the material taut around the work surfaces of the tools, and a support upon which the auxiliary tool is arranged to move from a position in which it is inactive and with its sheet material slack into a position adjacent to the main tool in which it is simultaneously brought under the influence of its tensioning means and the actuating shaft.

4. In a machine of the type described, a shaft, a tool mounted thereon, means for imparting to said shaft a combined oscillating and reciprocating movement, and auxiliary tool, means for rotatably supporting said tool in operative relation adjacent to said first tool, and means for detachably connecting said auxiliary tool to said shaft to receive one of these movements.

5. In a machine of the type described, a shaft, a tool mounted thereon, means for imparting to said shaft a combined oscillating and reciprocating movement, an auxiliary tool, means for rotatably supporting said tool in operative relation adjacent to said first tool, and means for connecting said auxiliary tool to said shaft constructed and arranged to impart thereto only the oscillating movement of the shaft.

6. In a machine of the class described, a main rotary tool, an auxiliary tool, a shaft supporting said main tool and arranged to impart thereto a combined oscillating and reciprocating movement, and means for operatively connecting said main tool to said auxiliary tool, constructed and arranged to impart a different movement to said auxiliary tool, each tool including a work-engaging member interposed between the body of the tool and the work and being movable independently of said body of the tool.

7. In a machine of the class described, a main tool, means for giving said tool a work rubbing movement of combined oscillation and reciprocation, an auxiliary tool, and means for detachably connecting said auxiliary tool to said main tool constructed and arranged to give said auxiliary tool an oscillating movement in a fixed plane.

8. In a machine of the type described, a tool including a strip of sheet material, means for imparting to the tool movements longitudinally and transversely of the strip, an auxiliary tool including a strip of sheet material, means for supporting said auxiliary tool in operative relation to the first-named tool, and means for connecting said auxiliary tool to said first-named tool constructed and arranged to impart to the strip of the former but one of the movements of the latter.

9. In a machine of the type described, a fixed bracket, a bracket pivotally connected to said first bracket and adapted to be held in a plurality of positions, an auxiliary tool rotatably mounted in said movable bracket, a shaft mounted in the fixed bracket, a tool mounted thereon, means for imparting to said shaft a combined oscillating and reciprocating movement, and means for slidably connecting said shaft to said auxiliary tool constructed and arranged to impart thereto only its oscillating movement.

10. In a machine of the class described, a tool including a strip of sheet material, means for holding said strip taut around said tool, a second tool adapted to be operatively connected with said first tool and supported for rotary movement in a fixed plane, said second tool including a strip of sheet material, means for holding said strip taut around said tool, means for oscillating said first tool on its axis to move the strip longitudinally and simultaneously reciprocating it axially, and transversely of the strip and means for operatively connecting said tools constructed and arranged to cause movement of the first tool, as described, to oscillate said second tool in a fixed plane longitudinally only of its strip.

11. In a machine of the class described, the combination with a tool having a work surface and means for imparting a combined oscillating and reciprocating movement thereto, of an auxiliary tool having a work surface, said auxiliary tool being provided with a metal backing plate for giving it rigidity in a plane perpendicular to its axis of rotation and means for connecting said auxiliary tool to the companion tool constructed and arranged to impart only the oscillating movements of the latter thereto.

12. In a machine of the type described, a supporting frame, a main tool rotatably supported upon said frame in a substantially fixed position, means for imparting a combined oscillating and reciprocating movement to said main tool, an auxiliary tool, means for supporting said auxiliary tool constructed and arranged to allow said tool to be brought into and out of an operative position substantially co-axial with said main tool, pins upon one of said tools, and a plate with complementary apertures upon the other said tool co-acting with said pins to impart to the auxiliary tool only the oscillating movement of the main tool.

13. In a machine of the class described, a tool, means for oscillating said tool on its axis and simultaneously reciprocating said tool axially, a bracket pivotally mounted upon said machine and adapted to be held in a plurality of positions, an auxiliary tool mounted upon a shaft in said bracket for rotation in a fixed plane, a plate provided with apertures and fixed on said auxiliary tool shaft, pins secured to said main tool operating means, said auxiliary tool bracket being adapted to be brought into position so that said pins will operatively engage the apertures on said plate and impart to said tool an oscillating movement in a fixed plane.

14. In a machine of the class described, a tool shaft, a main tool mounted thereon, pins secured to said tool shaft, a fixed bracket upon said machine, an auxiliary bracket pivotally mounted upon a spring-pressed plunger in said main bracket and arranged to assume a plurality of positions relative thereto, an auxiliary tool journaled in said auxiliary bracket and provided with a plate in which there are apertures adapted to be brought into operative relation to said pins, spring-pressed plungers in said main bracket in line with said main tool and said auxiliary tool, each of said plungers having a bifurcated end and adapted to tension a strip of sheet material wrapped around the work surface of its respective tool.

15. In a machine of the type described, a tool, means for imparting to said tool a compound movement, an auxiliary tool, means for supporting said auxiliary tool in operative relation to the first-named tool, and means for connecting said auxiliary tool to said first-named tool constructed and arranged to impart to the former a component only of the compound movement.

In testimony whereof I have signed my name to this specification.

FREDERICK M. FURBER.